(12) United States Patent
Goldman et al.

(10) Patent No.: US 6,684,244 B1
(45) Date of Patent: Jan. 27, 2004

(54) AGGREGATED POLICY DEPLOYMENT AND STATUS PROPAGATION IN NETWORK MANAGEMENT SYSTEMS

(75) Inventors: Jason D Goldman, Ft Collins, CO (US); Peter Thomas Houck, Ft Collins, CO (US); David Jonathan Lachelt, Ft Collins, CO (US); Fredrick M Roeling, Fort Collins, CO (US); Paul A Stoecker, Ft Collins, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 09/479,205

(22) Filed: Jan. 7, 2000

(51) Int. Cl.$^7$ ............................................. G06F 15/173
(52) U.S. Cl. ................................. 709/223; 370/395.21
(58) Field of Search ............................. 709/225, 223; 370/254, 395.21

(56) References Cited

U.S. PATENT DOCUMENTS

| | | | |
|---|---|---|---|
| 5,555,346 A | | 9/1996 | Gross et al. |
| 5,812,819 A | | 9/1998 | Rodwin et al. |
| 5,870,561 A | | 2/1999 | Jarvis et al. |
| 5,889,953 A | | 3/1999 | Thebaut et al. |
| 6,021,438 A | | 2/2000 | Duvvoori et al. |
| 6,041,347 A | | 3/2000 | Harsham et al. |
| 6,064,656 A | | 5/2000 | Angal et al. |
| 6,105,027 A | | 8/2000 | Schneider et al. |
| 6,158,010 A | | 12/2000 | Moriconi et al. |
| 6,167,445 A | | 12/2000 | Gai et al. |
| 6,170,009 B1 | * | 1/2001 | Mandal et al. ............... 709/223 |
| 6,233,686 B1 | | 5/2001 | Zenehelsky et al. |
| 6,237,036 B1 | | 5/2001 | Ueno et al. |
| 6,345,386 B1 | * | 2/2002 | Delo et al. ................... 717/176 |
| 6,405,251 B1 | * | 6/2002 | Bullard et al. ............... 709/224 |
| 6,418,467 B1 | * | 7/2002 | Schweitzer et al. ......... 709/223 |
| 6,418,468 B1 | * | 7/2002 | Ahlstrom et al. ............ 709/223 |
| 6,446,200 B1 | * | 9/2002 | Ball et al. ....................... 713/1 |
| 6,463,470 B1 | * | 10/2002 | Mohaban et al. ............ 709/223 |
| 6,466,932 B1 | * | 10/2002 | Dennis et al. ................... 707/3 |
| 6,502,131 B1 | * | 12/2002 | Vaid et al. ................... 709/224 |
| 6,587,466 B1 | * | 7/2003 | Bhattacharya et al. . 370/395.21 |

FOREIGN PATENT DOCUMENTS

| | | | | |
|---|---|---|---|---|
| GB | 2337409 A | | 1/1998 | ............ H04Q/3/00 |
| GB | 2356316 A | | 2/2000 | ............ H04Q/3/00 |
| WO | WO 96/2134 | | 11/1996 | |

OTHER PUBLICATIONS

Internet Draft, Internet Engineering Task Force, An Expedited Forward PHB (Jun. 1999), < http://w w w.ietf.org/>.

(List continued on next page.)

Primary Examiner—Bunjob Jaroenchonwanit

(57) ABSTRACT

A method for deployment of policy to a target connected to a network for the purpose of controlling the actions of that target based upon certain predefined conditions. The policy contains one or more policy rules with each rule defining conditions that when evaluated true trigger actions to allow or deny quality of service related resources (e.g., bandwidth or priority). Techniques are disclosed which provide for policy implementation in an aggregation rather than one at a time. The number of steps that a user must perform to implement policy in the network is reduced, the user can group a related set of policies, and all of the targets destined to receive policy changes can do so at approximately the same time, so device configuration changes can be coordinated. Having initiated an aggregated policy change, the user can track the status of the aggregate operation as well as the individual status changes which comprise the aggregate operation. In representative embodiments, users are able to see how individual targets are responding to the policy deployed to them, as well as recognize when the aggregate set of operations has completed. In a similar manner, policy can be aggregated for undeployment and the subsequent undeployment tracked on a computer.

38 Claims, 8 Drawing Sheets

OTHER PUBLICATIONS

Stardust.com, Inc., Introduction to QoS Policies (Jul. 1999), <http://www.stardust.com/policy/whitepapers/qospol.htm/>.

Internet Draft, Internet Engineering Task Force, SNMP–Based QoS Programming Interface MIB for Routers (Oct. 1999), < http://w w w.kanadas.com/activenet/intex.html/>.

Internet Draft, Internet Engineering Task Force, An Architecture for Differentiated Services (Dec. 1998), < http://w w w.ietf.org/>.

Internet Draft, Internet Engineering Task Force, A Two–bit Differentiated Services Architecture for The Internet (Jul. 1999), < http://w w w.ietf.org/>.

U.S. patent application Ser. No. 09/479,206, Goldman, et al., filed Jan. 7, 2000.

U.S. patent application Ser. No. 09/382,059, Mahon et al., filed Aug. 24, 1999.

U.S. patent application Ser. No. 09/382,171, Mahon et al., filed Aug. 24, 1999.

U.S. patent application Ser. No. 09/382,172, Mahon et al., filed Aug. 24, 1999.

U.S. patent application Ser. No. 09/382,174, Mahon, filed Aug. 24, 1999.

U.S. patent application Ser. No. 09/382,175, Mahon et al., filed Aug. 24, 1999.

U.S. patent application Ser. No. 09/382,176, Roeling et al., filed Aug. 24, 1999.

* cited by examiner

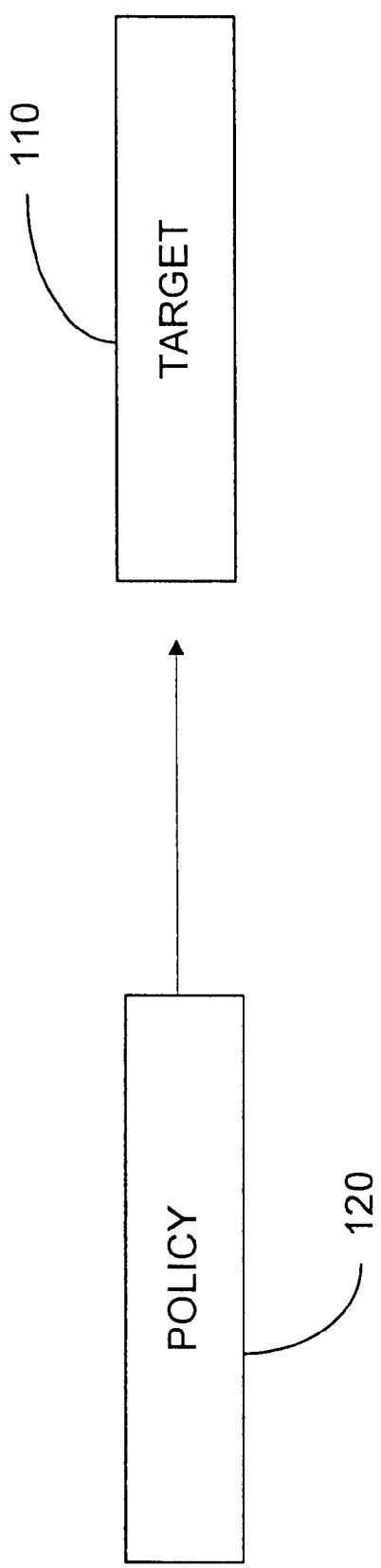

ns in Network
AGGREGATED POLICY DEPLOYMENT AND STATUS PROPAGATION IN NETWORK MANAGEMENT SYSTEMS

FIELD OF THE INVENTION

The present invention relates generally to networks, more particularly to network management, and even more particularly to policy-based network management.

BACKGROUND OF THE INVENTION

The various features of modern network devices are typically managed as a unit. Consider as an example, a router connected to several networks. The router has multiple interfaces, with each interface representing a connection for routing traffic between one or more of these networks. Each interface of the router can also have multiple capabilities, each of which can affect the traffic in different ways. These different aspects of a single device managed together often presents a difficult to understand interface to the administrator of the network. As a result, the management of even a single device can become a daunting task.

Policy-based network management can help make this task easier to understand and implement. Rules for management of a device are combined to form a policy for the device. The devices to be managed are referred to as enforcement points, the targets of the policy, or more simply as targets.

The purpose of policy-based network management is to coordinate device management across an entity's network by enforcing rules related to Service Level Agreements (SLAs). SLAs are agreements made between network users and the network provider. Policy is a method of translating those agreements into actions designed to provide the type and level of service agreed upon. A policy describes a set of rules, where a rule specifies a set of conditions with the specific action to take when those conditions are satisfied. The actions described within policy rules generally relate to Quality of Service (QoS) capabilities, e.g. bandwidth allocated or priority assigned to the traffic. By using policy-based network management, a structural format is provided wherein network administrators can avoid the tedious process of individually configuring multiple network devices, e.g., routers and traffic shapers, each of which has its own particular syntax and mapping of QoS actions to device resources. For example, an Access Control List (ACL) maintains a list of network resources which could, among other things, define permissible actions of a port on a router under specified conditions.

Deploying policy involves moving the policy onto a target or policy configuration agent, translating the policy into target-specific configuration, and loading the configuration. If performed one at a time for each target, this process can be complicated and time consuming. In addition, there can be a significant time delay in deploying related policies to one or more targets. Complicating this situation is the fact that deployment of a given policy to its target does not always occur in the order that the policy was moved by the server program and, in fact, implementation on the target may not actually occur due to errors or inconsistencies in the policy. Thus, confusing and conflicting situations can exist when policies are individually deployed. In addition, with multiple targets receiving policies at differing times, it has been impossible to keep track of which targets have actually implemented the policy changes.

Thus, there is a need for a means to simplify the deployment of multiply policies, to have those policies deployed at approximately the same time, and to provide a method for reporting the status of policy deployment on a target by target basis, as well as on an aggregate basis.

SUMMARY OF THE INVENTION

The present patent document relates to a novel method for deployment of policy to targets connected to a network for the purpose of controlling the actions of the targets based upon certain predefined conditions. In representative embodiments, the present patent document discloses methods for aggregating targeted policies and deploying such policies at the same time. Mechanisms are also provided whereby the targets can report changes in policy deployment status to a server program which can display such changes.

Electronic systems, such as networks, that comprise resources or processes can control the interaction of such items by means of Quality of Service (QoS) mechanisms. These mechanisms can be controlled at a higher level of abstraction using rules, which relate an action, i.e., controlling the QoS mechanism, to a set of conditions describing when to apply the rule. The combination of one or more rules for a given target is referred to herein as a policy. The controlled items could be for example processes, functions, abstract objects, or physical electronic devices such as computers, printers, etc. Thus, policy refers to the description of behaviors or actions that are desired for the item to which the policy applies. In network systems, policies are typically associated with items that affect the flow of data on that network. In order to affect that network traffic flow, policies are directed toward or targeted at managed or controlled entities.

As referred to herein, a target is a process or resource that is being managed using policy. The managed item itself may be able to recognize and conform to the policy directly, or may be managed by a proxy which recognizes policy information and converts it to configuration information that the managed entity can recognize and conform to.

Using the concept of targets, a particular capability or rule can be isolated to a single manageable element which has that capability or functions according to the rules of the policy. In this way the administrator can more readily deal with the manner in which network traffic is to be treated at specific points in the network.

In aggregated policy deployment to targets as described in various representative embodiments of the present patent document, at least one policy is deployed to multiple targets as a single operation. As an example, consider three devices which could be, for example, three routers with the first device comprising first and second interfaces, with the second device comprising third and fourth interfaces, and with the third device comprising a fifth interface. First, second, third, fourth, and fifth interfaces are also referred to as first, second, third, fourth, and fifth targets respectively. In this example, a first policy and a second policy are deployed in the aggregate as follows: first policy deployed to first, third, and fifth targets and (2) second policy deployed to second and fourth targets.

Primary advantages of the embodiments as described in the present patent document over prior methods for deploying policy are (1) aggregated policy deployment simplifies the number of steps that a user must perform to implement policy in the network, (2) it allows the user to group a related set of policies, and (3) all of the targets destined to receive policy changes do so at approximately the same time, so device configuration changes can be coordinated.

Having initiated an aggregated policy change, the user can track the status of the aggregate operation as well as the individual status changes which comprise the aggregate operation. In representative embodiments, users are able to see how individual targets are responding to the policy deployed to them, as well as recognize when the aggregate set of operations has completed.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and:

FIG. 1 is a drawing showing a policy related to a target as described in various representative embodiments of the present patent document.

DETAILED DESCRIPTION OF THE PREFERRED EMBODIMENTS

1. Introduction

Figure 2A:
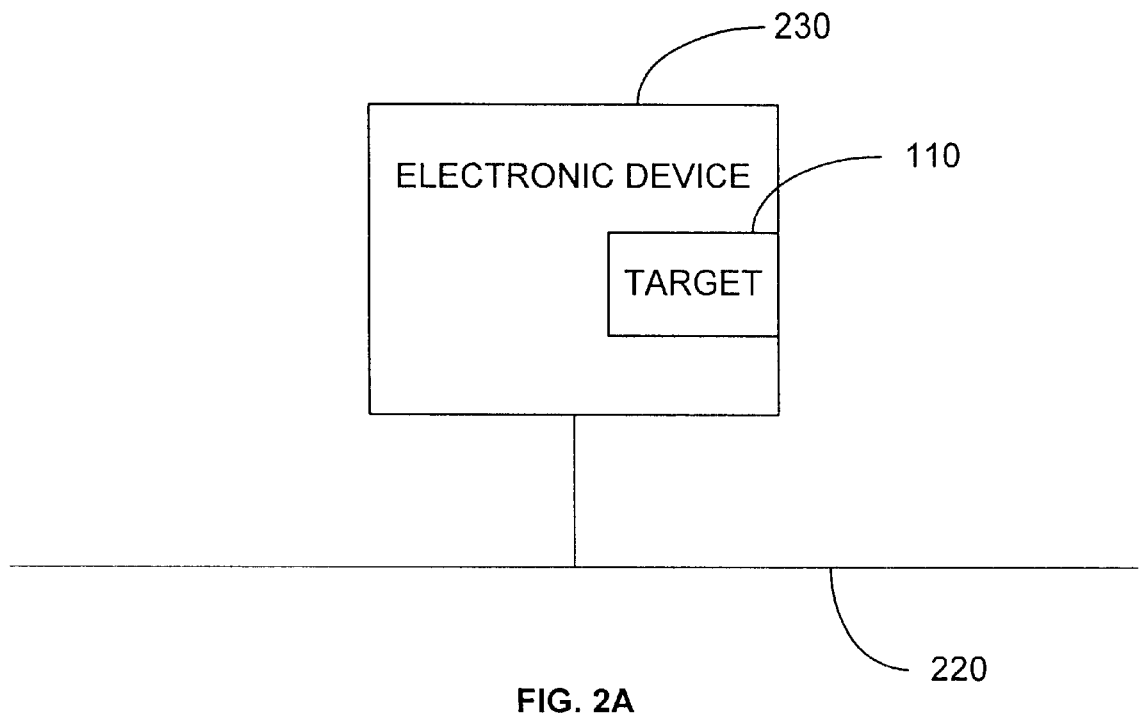
FIG. 2A is a drawing of the target connected to a network as described in various representative embodiments of the present patent document.

As shown in the drawings for purposes of illustration, the present patent document relates to a novel method for transferring policy to a target connected to a network for the purpose of controlling the actions of that target based upon certain predefined conditions. Previous methods for such transfer have relied upon transferring policy to each device individually. In representative embodiments, the present patent document discloses methods for transferring device specific policy in groups in order to simplify the steps that a user must go through to implement policy in a network and in order to transfer those policies to the targets at approximately the same time. In addition, methods are disclosed for reporting the status of policy deployment. In the following detailed description and in the several figures of the drawings, like elements are identified with like reference numerals.

2. Policies

Electronic systems, such as networks, that comprise resources or processes can control the interaction of such items by means of Quality of Service (QoS) mechanisms. These mechanisms can be controlled at a higher level of abstraction using rules, which relate an action, i.e., controlling the QoS mechanism, to a set of conditions describing when to apply the rule. The combination of one or more rules for a given target is referred to herein as a policy. The controlled items could be for example processes, functions, abstract objects, or physical electronic devices such as computers, printers, etc. Thus, policy refers to the description of behaviors or actions that are desired for the item to which the policy applies. In network systems, policies are typically associated with items that affect the flow of data on that network. In order to affect that network traffic flow, policies are directed toward or targeted at managed or controlled entities. An example of a policy is as follows: assign priority 5 to traffic from the user whose name is user_one.

3. Targets

FIG. 1 is a drawing showing a policy 120 related to a target 110 as described in various representative embodiments of the present patent document. As referred to herein, the target 110 is a process or resource that is being managed using policy 120. The managed item itself may be able to recognize and conform to the policy 120, or may be managed by a proxy which recognizes policy 120 information and converts it to configuration information that the managed entity can recognize and conform to. In representative embodiments, the present patent document discloses techniques by which multiple policies 120 can be deployed in groups in order to manage separate aspects of specified devices, i.e., targets 110.

As used herein, deployment of policy 120 to target 110 means reconfiguration of the target 110 so as to conform to the policy 120 plus any required supporting steps. And, undeployment of policy 120 to target 110 means reconfiguration of the target 110 so as to remove the policy 120 plus any required supporting steps.

FIG. 2A is a drawing of the target 110 connected to a network 220 as described in various representative embodiments of the present patent document. In the example of FIG. 2A, the target 110 is a controllable entity of an electronic device 230 which is connected to the network 220. Using the concept of the target 110, a particular capability or rule can be isolated to a single manageable element which has that capability or functions according to the rules of the policy. In this way the administrator can more readily deal with the manner in which network traffic is to be treated at specific points in the network.

In the above example, the router could be the electronic device 230 and could also be the target 110. Alternatively, any of the interfaces of the router could be the target 110. In another example, the target 110 on the router could also be the priority queuing of messages on a specific individual interface, since it is at this point that the network traffic is actually affected.

Figure 2B:
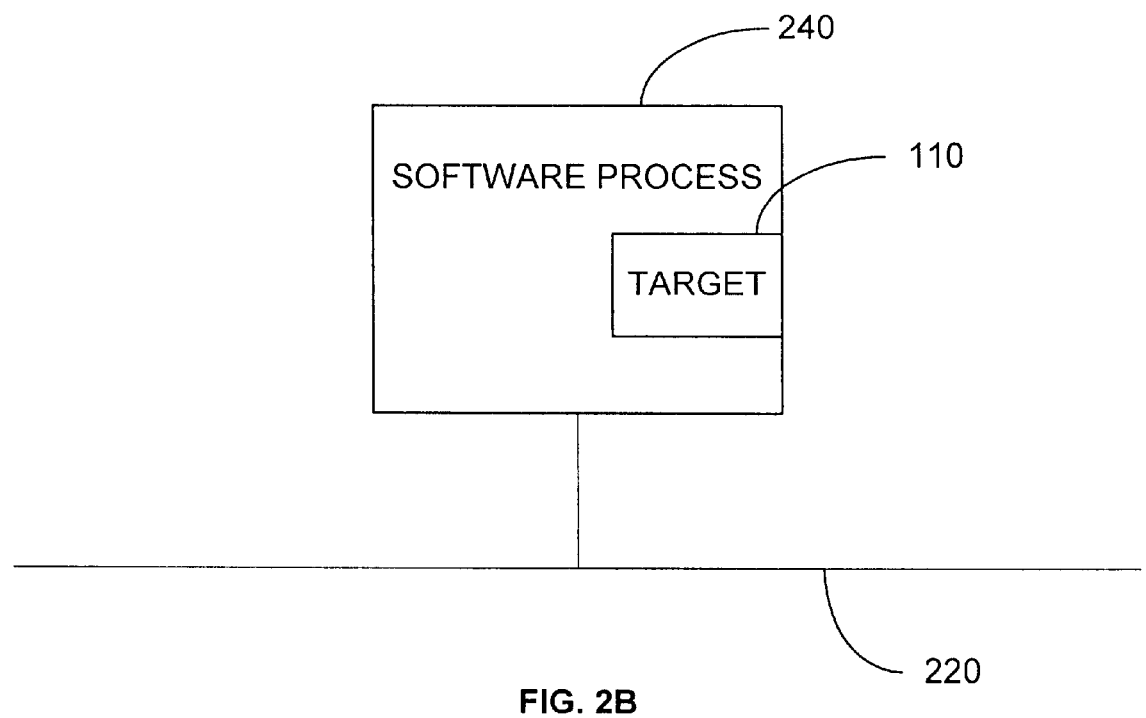
FIG. 2B is a drawing of another target connected to the network as described in various representative embodiments of the present patent document.

FIG. 2B is a drawing of another target 110 connected to the network 220 as described in various representative embodiments of the present patent document. In the example of FIG. 2B, the target 110 is a controllable entity of a software process 240, also referred to herein as a software program 240, which is connected to the network 220. Again using the concept of the target 110, a particular capability can be isolated to a single manageable function within the software process 240 which has the specified capability or functions according to the rules of the policy.

Breaking such capabilities into separate conceptual targets 110 of policy 120, as in the example of the interfaces of the router, enables the same description of behavior to be applied to many different devices which, in a high-level abstraction, provide similar capabilities. In addition, with the appropriate abstractions, devices from different vendors, and indeed different types of devices, e.g., routers, switches, and traffic shapers can be managed with identical policies 120. Traffic shapers are a class of devices that regulate or shape the flow of network traffic based on a histogram of such traffic.

Thus, the concept of targets 110 can be abstracted down to a discreet function of the smallest manageable item on the single electronic device 230 or system, thereby providing the capability for efficient, simplified, large-scale management of the network 220 with policies 120.

Figure 3A:
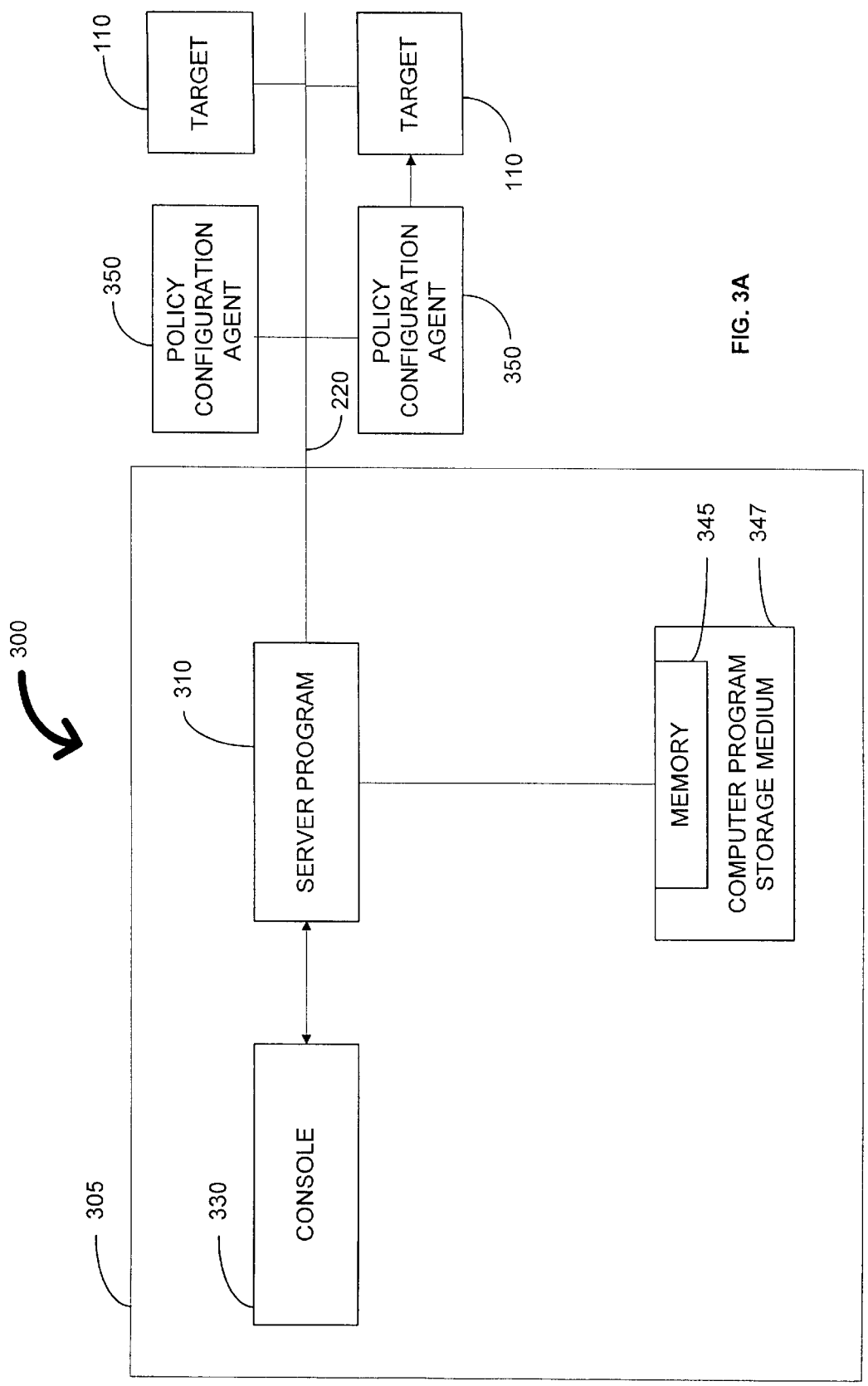
FIG. 3A is a drawing of a system for policy management by a server program for the target as described in various representative embodiments of the present patent document.

FIG. 3A is a drawing of a system 300 for policy 120 management by a server program 310 for the target 110 as described in various representative embodiments of the present patent document. A console 330 connected to the server program 310 provides the user interface to enable the assignment of policy 120 to the appropriate targets 110 prior to commitment as well as the grouping of policies 120 prior to deployment to the targets 110. The policy 120 is typically stored in a memory 345 located on a computer program storage medium 347 connected to the server program 310, all of which is located on a computer 305. In representative embodiments, the server program 310 transfers one or more policies 120 as a group to more than one targets 110 via the network 220 to their respective policy configuration agents 350 which in turn interact with the targets 110 on behalf of the server program 310. The policy configuration agents 350 update the policies 120 on the targets 110 and return the status of policy 120 deployment to the server program 310. In another embodiment, the policy configuration agents 350 may be integral parts of their respective targets 110.

The console 330 allows the user to deploy policy 120 to the target 110 and to undeploy policy 120 from a given target 110. As part of these operations, the user needs to know when the policy configuration agent 350 for the target 110 has received the policy 120 change, made the appropriate configuration changes on the device, and notified the server program 310 of the final status of the operation. In the case of a single deployment, this is a straightforward process. The user deploys policy 120 and watches the status of the target 110 to see when it changes. When multiple policy deployments are made, this process is more complicated.

However, fewer overall operational steps are required of the user if multiple deployment changes are made on an aggregated basis. Aggregation comprises bundling together a set of changes and transferring them to the policy configuration agents 350 or equivalently to the targets 110 in a single step. This process comprises transferring at least one policy 120 to more than one target 110 or their policy configuration agents 350 at the same time. Aggregated policy 120 deployment offers several advantages: (1) it simplifies the number of steps that a user must perform to implement policy 120 in the network 220, (2) it allows the user to group a related set of policy 120 changes, and (3) all of the targets 110 destined to receive policy 120 changes do so at approximately the same time, so device configuration changes can be coordinated.

Having initiated an aggregated policy 120 change, the user needs to be able to track the status of the aggregate operation, as well as the individual status changes which comprise the aggregate operation. In a representative embodiment, users are able to see how individual targets 110 are responding to the policy 120 deployed to them, as well as recognize when the aggregate set of operations has completed.

Figure 3B:
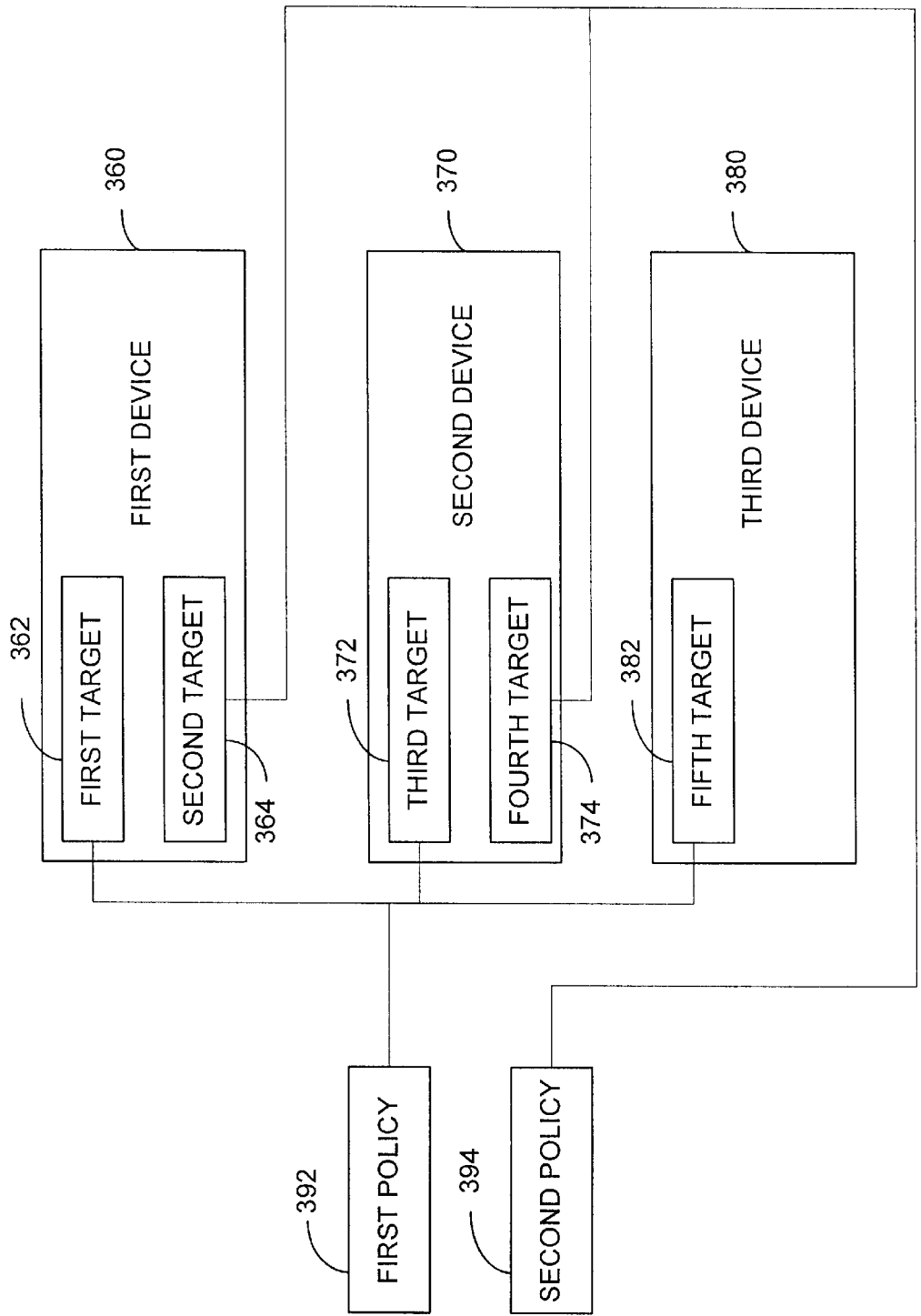
FIG. 3B is a drawing of aggregated policy deployment to targets as described in various representative embodiments of the present patent document.

FIG. 3B is a drawing of aggregated policy 120 deployment to targets 110 as described in various representative embodiments of the present patent document. The example of FIG. 3B comprises first, second, and third devices 360, 370,380 which could be, for example, three routers. The first device 360 has first and second interfaces 362,364; the second device 370 has third and fourth interfaces 372,374; and the third device 380 has a fifth interface 382. The first, second, third, fourth, and fifth interfaces 362,364,372,374, 382 are also referred to as first, second, third, fourth, and fifth targets 362,364,372,374,382 respectively. In this example, a first policy 392 and a second policy 394 are deployed in the aggregate as follows: (1) first policy 392 deployed to first, third, and fifth targets 362,372,382 and (2) second policy 394 deployed to second and fourth targets 364,374.

Figure 4:
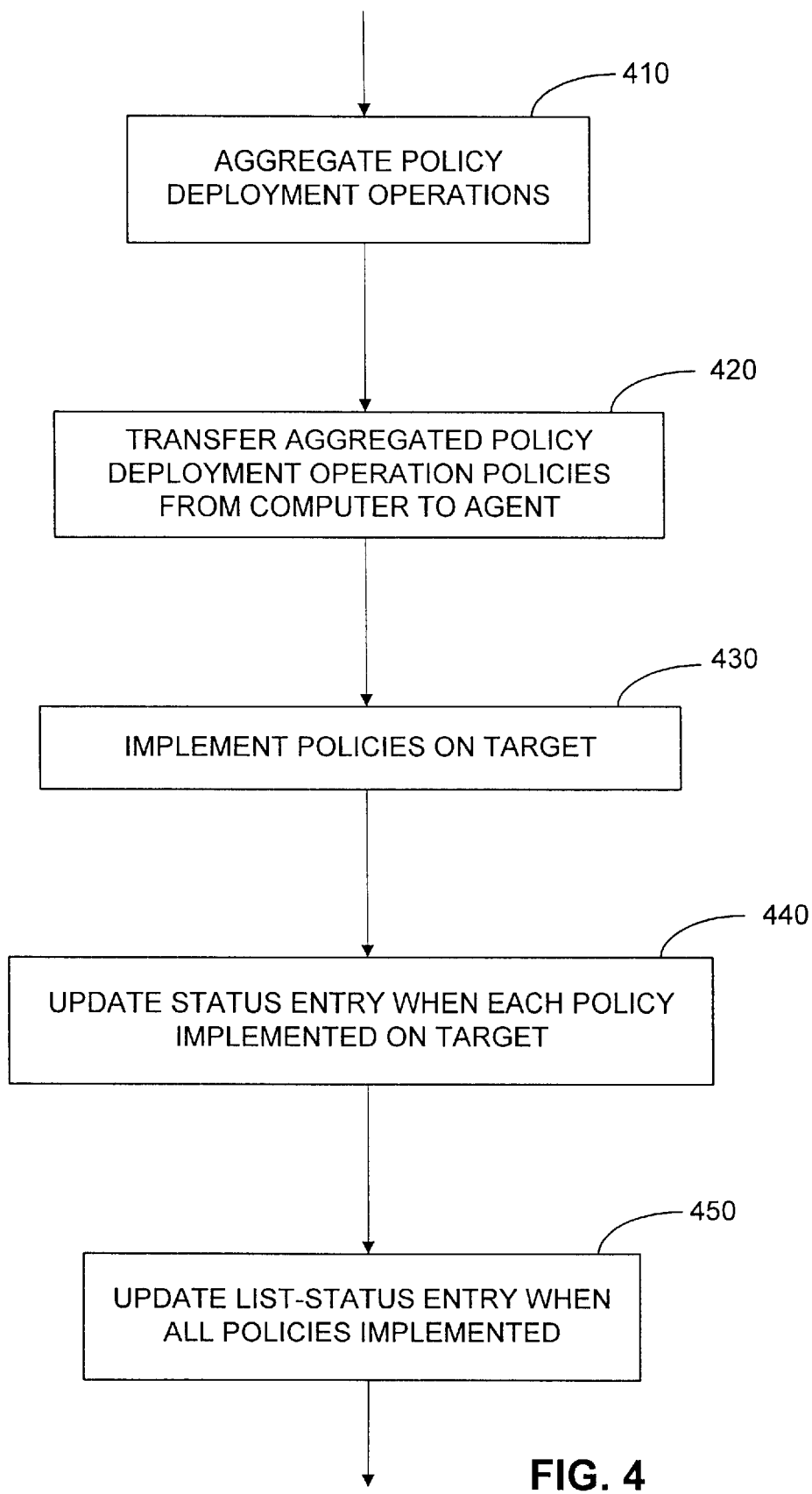
FIG. 4 is a flow chart of aggregated policy deployment as described in various representative embodiments of the present patent document.

FIG. 4 is a flow chart of aggregated policy 120 deployment as described in various representative embodiments of the present patent document. In block 410 the server program 310 aggregates policy deployment operations. The policies 120 associated with the aggregated policy deployment operations may or may not be related. Typically the policies 120 would have been created on the console 330 of FIG. 3A and would have been aggregated there. The policies 120 associated with the aggregated policy deployment operations would be stored in the memory 345 of the computer 305 and could, for example, be accessed by the server program 310. Block 410 transfers control to block 420.

In block 420, the policies 120 which are part of the aggregated policy deployment operations are transferred from the computer 305 to the appropriate policy configuration agents 350. Block 420 transfers control to block 430.

In block 430, the policies 120 are implemented on the targets 110. This implementation is typically performed by the policy configuration agents 350 associated with the targets 110 of the policies 120 in the aggregate. The policy configuration agent 350 could be running on a device separate from the target 110 or could be a part of the target 110. This transfer occurs for each policy 120 in the aggregate and to each policy configuration agent 350 associated with each target 110 that receives policy 120 from the aggregate. Block 430 transfers control to block 440.

Figure 5:
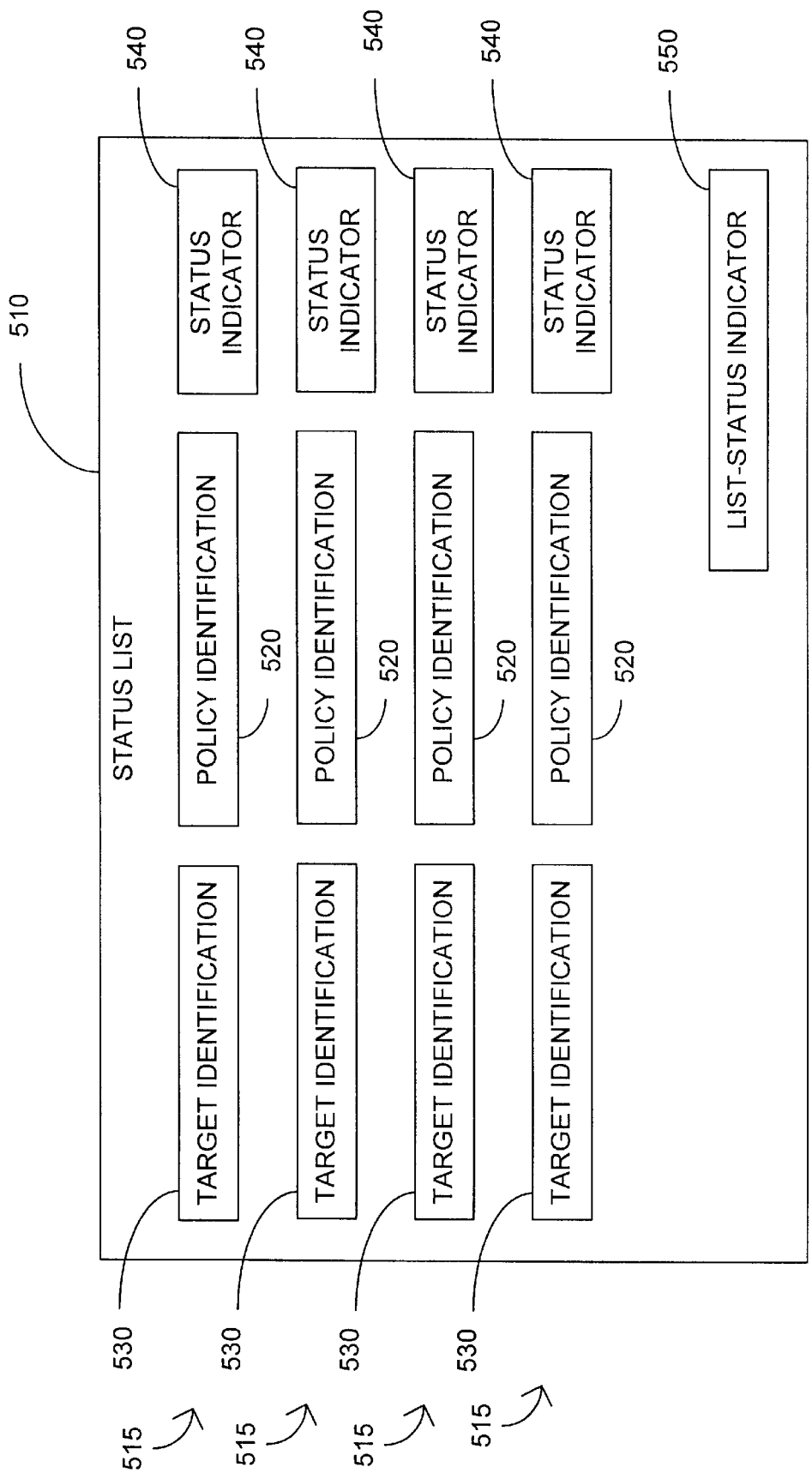
FIG. 5 is a drawing of a policy deployment status list as described in various representative embodiments of the present patent document.

In block 440, status of each implemented policy 120 is reported to the server program 310 and a status list 510 which is shown in FIG. 5 (described below) is updated. Block 440 transfers control to block 450.

In block 450, when all policies 120 in the aggregate have been implemented, a status entry is updated by the server program 310.

FIG. 5 is a drawing of the policy deployment status list 510 as described in various representative embodiments of the present patent document. The status list 510 comprises one status entry 515 for each policy 120 in the aggregate. Each status entry 515 comprises a policy identification 520 which identifies the policy 120, a target identification 530 which identifies the target 120 to which the policy 120 applies, and a policy status indicator 540 which indicates among other things whether or not the policy has been implemented. A list-status indicator 550 indicates whether or not all policies 120 in the aggregate have been implemented.

Figure 6:
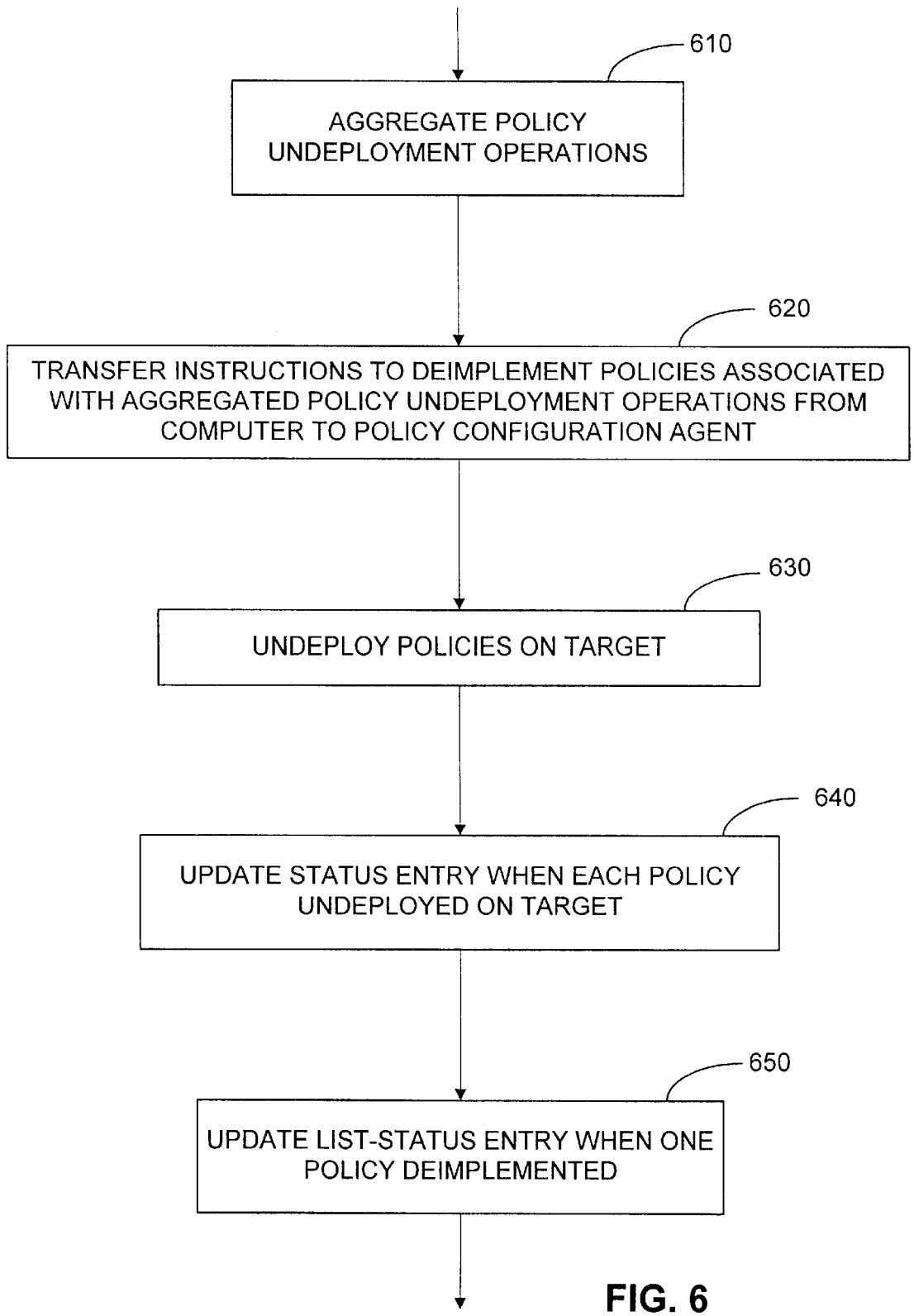
FIG. 6 is a flow chart of aggregated policy undeployment as described in various representative embodiments of the present patent document.

FIG. 6 is a flow chart of aggregated policy 120 undeployment as described in various representative embodiments of the present patent document. In block 610 the server program 310 aggregates policy undeployment operations. Typically this aggregation would take place on the console 330 of FIG. 3A. Block 610 transfers control to block 620.

In block 620, the instructions to deimplement (to remove or deactivate) policies 120 associated with the aggregated policy undeployment operations are transferred from the computer 305 to the policy configuration agent 350. Block 620 transfers control to block 630.

In block 630, the policies 120 are undeployed on the targets 110. This undeployment is typically performed by the policy configuration agents 350 associated with the targets 110 of the policies 120 in the aggregate. The policy configuration agents 350 could be running on devices separate from the targets 110 or could be integral parts of the targets 110. This transfer occurs for each policy 120 in the aggregate and to each policy configuration agent 350 associated with each target 110 that receives policy. 120 from the aggregate. Block 630 transfers control to block 640.

In block 640, status of each undeployed policy 120 is reported to the server program 310 and the status list 510 which is shown in FIG. 5 is updated. Block 640 transfers control to block 650.

In block 650, when each policy 120 in the aggregate is undeployed, a status flag is updated by the server program 310.

There are a number of different methods that the user at the console 330 could use to aggregate policy 120 deployment as follows: (1) select the policy 120 and deploy that policy 120 to multiple targets 110, (2) implement all assigned policies 120 on all targets 110 which have an assignment, (3) select the policy 120 and undeploy it from all targets 110 where it is currently deployed In each case, the user is presented with a list of the policy 120 changes that are possible given the initiating action. The user can choose a subset of this list or all members and tell the system to perform the given operation.

The user uses the console 330 to build a list of deployment/undeployment changes. This list comprises three items: (1) the action required (deployment/undeployment), (2) the policy target identification, and (3) the policy identification.

There are a number of steps involved in making a single implementation change. If the console 330 merely reflects status changes, then the user must determine on their own whether the deployment operation has completed based on watching the status of particular target. This is because there is no feedback on an implementation operation until the last step where the status change comes back from the server. Complicating this is the fact that the steps outlined above do not happen in a vacuum. Other, independent changes to the policy management system can occur at any time. So, for example, the console 330 can receive notification of a status chance on another independent resource while waiting for the deployment operation to complete.

Providing a mechanism to address this problem for the single implementation operation case is valuable, but to support aggregated deployment operations, its'vital. This mechanism relies on using a transaction for tracking deployment changes. A transaction supports this by identifying what status changes are expected for a given implementation operation (aggregate or single) and then recognizing when those changes have been received.

Figure 7:
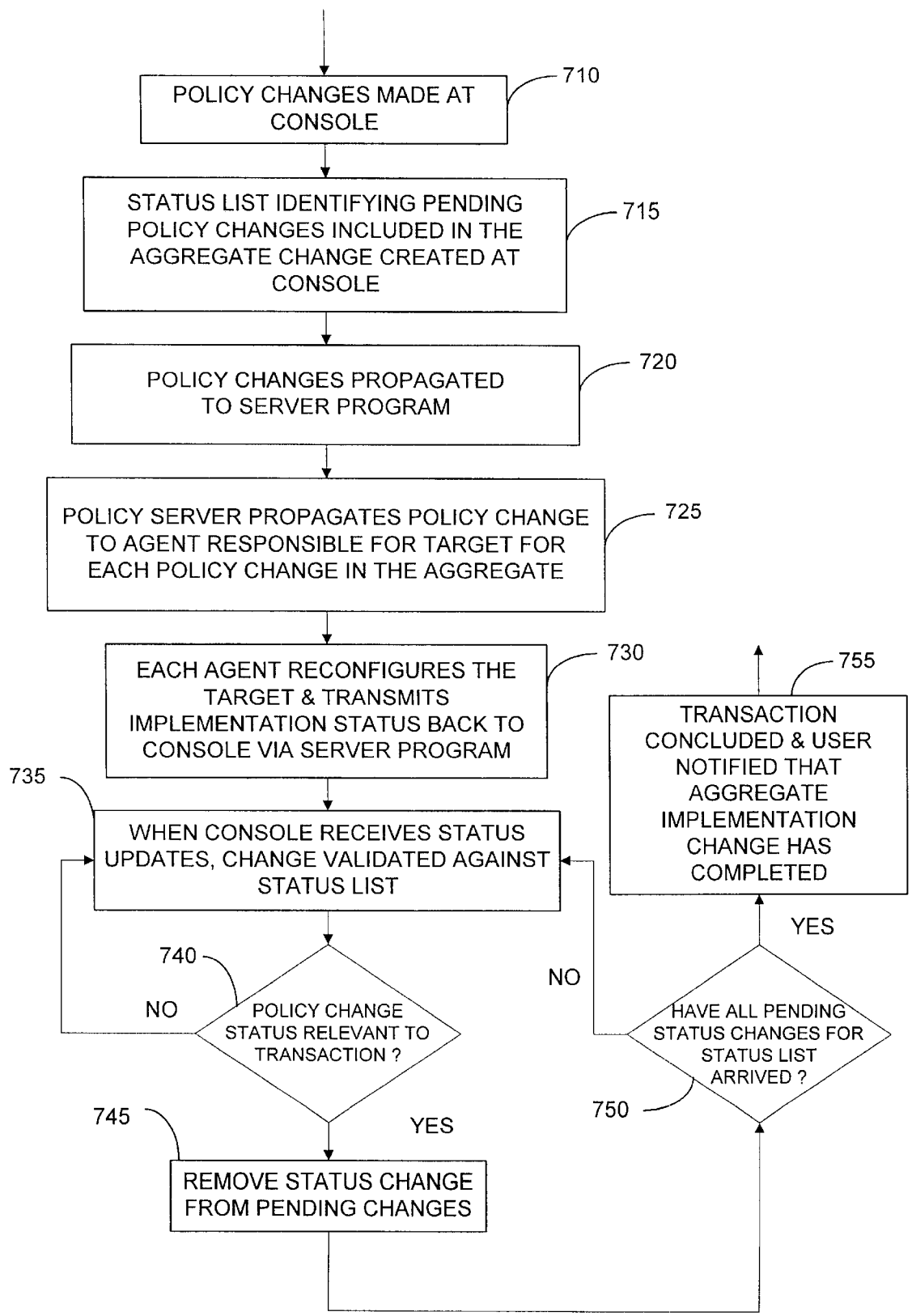
FIG. 7 is a flow chart of another aggregated policy deployment as described in various representative embodiments of the present patent document.

FIG. 7 is a flow chart of another aggregated policy 120 deployment as described in various representative embodiments of the present patent document. In block 710 policy 120 changes are made at the console 330. The console 330 is typically a Graphical User Interface (GUI) console 330. Block 710 transfers control to block 715.

In block 715, the status list 510 which identifies the pending policy 120 changes included in the aggregate policy 120 change to be implemented is created on the console 330. Block 715 transfers control to block 720.

In block 720, policy changes 120 are propagated to the server program 310. Block 720 transfers control to block 725.

In block 725, the server program 310 propagates the policy 120 changes to the policy configuration agents 350 responsible for the targets 110 for each policy 120 change in the aggregate. Block 725 transfers control to block 730.

In block 730, each policy configuration agent 350 reconfigure each target 110 assigned to each policy 120 in the aggregate and transmits the implementation status back to the console 330. Block 730 transfers control to block 735.

In block 735, when the console 330 receives status updates, the policy 120 implementation is validated against the status list 510. Block 735 transfers control to block 740.

In block 740, when the policy 120 change status is validated block 740 transfers control to block 745, otherwise block 740 transfers control to block 735.

In block 745, the status entry 515 in the status list 510 is changed to indicate that the policy 120 has been deployed on the target 110. Block 745 transfers control to block 750.

In block 750, when all pending status changes for policy 120 in the aggregation have been deployed, 750 transfers control to block 735, otherwise block 750 transfers control to block 755.

In block 755, the list-status indicator 550 in the status list 510 is changed to indicate that all policy 120 changes in the aggregate have been deployed. Block 755 terminates the process.

The console 330 can also provide the user with the current state of the transaction by displaying the list of changes in the aggregate and the status of each as either pending or whatever status change came back from the targets 110.

Once again, this is not the only possible mechanism for providing transactions. For example, this could also be managed at the policy server layer. In any event, some form of transaction management is important in support of aggregated deployment changes.

6. Cconcluding Remarks

Primary advantages of the embodiments as described in the present patent document over prior methods for deploying policy are (1) aggregated policy 120 deployment simplifies the number of steps that a user must perform to implement policy 120 in the network 220, (2) it allows the user to group a related set of policy 120, and (3) all of the targets 110 destined to receive policy 120 changes do so at approximately the same time, so device configuration changes can be coordinated.

Having initiated an aggregated policy 120 change, the user can track the status of the aggregate operation as well as the individual status changes which comprise the aggregate operation. In representative embodiments, users are able to see how individual targets 110 are responding to the policy 120 deployed to them, as well as recognize when the aggregate set of operations has completed.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A computer network implemented method, comprising:
   on a computer connected to a network, aggregating at least two policy deployment operations, providing a different target is associated with each policy deployment operation, providing a policy is associated with each target, providing the targets are resources connected to the network, providing each policy deployment operation comprises the policy and an identification of the particular target to which the policy of that policy deployment operation is associated, and providing the step of aggregating the policy deployment operations comprises assembling the policy deployment operations of a plurality of policies into a combined instruction; and
   from the computer, transferring the combined instruction at substantially the same time to at least two policy configuration agents, providing each policy configuration agent is located remote from the computer, providing each policy configuration agent is accessible via the network, and providing each policy configuration agent has capability of implementing at least one policy on at least one target associated with that policy configuration agent.

2. The method as recited in claim 1, further comprising:
   by the policy configuration agents, implementing policies on associated targets.

3. The method as recited in claim 1, providing the target is selected from the group consisting of an electronic device, an interface of the electronic device, function implementable on the electronic device, function implementable on the interface of the electronic device, a software program, and function implementable in the software program.

4. The method as recited in claim 1, further comprising:
   in a status list comprising at least two status entries, providing each status entry comprises a target identification, an associated policy identification, and a status indicator for each aggregated policy deployment operation, when one of the policies has been implemented on the associated target, updating the status entry for the target to indicate policy implementation completed.

5. The method as recited in claim 4, further comprising:
   when all policies in the status list have been implemented, updating a list-status indicator to indicate that all policies in the status list have been implemented.

6. The method as recited in claim 1, providing one of the policies comprises at least one rule which differs from each and every rule of at least one other policy.

7. The method as recited in claim 1, providing one of the targets differs in type from at least one other target.

8. A computer network implemented method, comprising:
   on a computer connected to a network, aggregating at least two policy undeployment operations, providing a different target is associated with each policy undeployment operation, providing a policy is associated with each target, providing the targets are resources connected to the network, providing each policy undeployment operation comprises the policy and an identification of the particular target to which the policy of that policy undeployment operation is associated, and providing the step of aggregating, the policy undeployment operations comprises assembling the policy undeployment operations of a plurality of policies into a combined instruction; and
   from the computer, transferring the combined instruction to deimplement the policies associated with the aggregated policy undeployment operations at substantially the same time to at least two policy configuration agents, providing each policy configuration agent: is located remote from the computer, providing each policy configuration agent is accessible via the network, and providing each policy configuration agent has capability of deimplementing at least one policy on at least one target associated with that policy configuration agent.

9. The method as recited in claim 8, further comprising:
   by the policy configuration agents, deimplementing policies on associated targets.

10. The method as recited in claim 8, providing the target is selected from the group consisting of an electronic device, an interface of the electronic device, function implementable on the electronic device, function implementable on the interface of the electronic device, a software program, and function implementable in the software program.

11. The method as recited in claim 8, further comprising:
    in a status list comprising status entries, providing each status entry comprises a target identification, an associated policy identification, and a status indicator for each aggregated policy undeployment operation, when one of the policies has been deimplemented on the associated target, updating the status entry for the target to indicate policy deimplementation completed.

12. The method as recited in claim 11, further comprising:
    when all policies in the status list have been deimplemented, updating a list-status indicator to indicate that all policies in the status list have been deimplemented.

13. The method as recited in claim 8, providing one of the policies comprises at least one rule which differs from each and every rule of at least one other policy.

14. The method as recited in claim 8, providing one of the targets differs in type from at least one other target.

15. A computer program storage medium readable by a computer, embodying a computer program of instructions executable by the computer, comprising:
    on a computer connected to a network, aggregating at least two policy deployment operations, providing a different target is associated with each policy deployment operation, providing a policy is associated with each target, providing the targets are resources connected to the network, providing each policy deployment operation comprises the policy and an identification of the particular target to which the policy of that policy deployment operation, is associated, and providing the step of aggregating the policy deployment operations comprises assembling the policy deployment operations of a plurality of policies into a combined instruction; and
    from the computer, transferring the combined instruction at substantially the same time to at least two policy configuration agents, providing each policy configuration agent is located remote from the computer, providing each policy configuration agent is accessible via the network, and providing each policy configuration agent has capability of implementing at least one policy on at least one target associated with that policy configuration agent.

16. The computer program storage medium as recited in claim 15, wherein the target is selected from the group consisting of an electronic device, an interface of the electronic device, function implementable on the electronic device, function implementable on the interface of the electronic device, a software program, and function implementable in the software program.

17. The computer program storage medium as recited in claim 15, further comprising:
in a status list comprising status entries, providing each status entry comprises a target identification, an associated policy identification, and a status indicator each aggregated policy deployment operation, when one of the policies has been implemented on the associated target, updating the status entry for the target to indicate policy implementation completed.

18. The computer program storage medium as recited in claim 17, further comprising:
when all policies in the status list have been implemented, updating a list-status indicator to indicate that all policies in the status list have been implemented.

19. The computer program storage medium as recited in claim 15, wherein one of the policies comprises at least one rule which differs from each and every rule of at least one other policy.

20. The computer program storage medium as recited in claim 15, wherein one of the targets differs in type from at least one other target.

21. A computer program storage medium readable lay a computer, embodying a computer program of instructions executable by the computer, comprising:
on a computer connected to a network, aggregating at least two policy undeployment operations, providing a different target is associated with each policy undeployment operation, providing a policy is associated with each target, providing the targets are resources connected to the network, providing each policy undeployment operation comprises the policy and an identification of the particular target to which the policy of that policy undeployment operation is associated, and providing the step of aggregating the policy undeployment operations comprises assembling the policy undeployment operations of a plurality of policies into a combined instruction; and
from the computer, transferring the combined instruction to deimplement the policies associated with the aggregated policy undeployment operations at substantially the same time to at least two policy configuration agents, providing each policy configuration agent is located remote from the computer, providing each policy configuration agent is accessible via the network, and providing each policy configuration agent has capability of deimplementing at least one policy on at least one target associated with that policy configuration agent.

22. The computer program storage medium as recited in claim 21, wherein the target is selected from the group consisting of an electronic device, an interface of the electronic device, function implementable on the electronic device, function implementable on the interface of the electronic device, a software program, and function implementable in the software program.

23. The computer program storage medium as recited in claim 21, further comprising:
in a status list comprising status entries, providing each status entry comprises a target identification, an associated policy identification, and a status indicator for each aggregated policy undeployment operation, when one of the policies has been deimplemented on the associated target, updating the status entry for the target to indicate policy deimplementation completed.

24. The computer program storage medium as recited in claim 23, further comprising:
when all policies in the status list have been deimplemented, updating a list-status indicator to indicate that all policies in the status list have been deimplemented.

25. The computer program storage medium as recited in claim 21, wherein one of the policies comprises at least one rule which differs from each and every rule of at least one other policy.

26. The computer program storage medium as recited in claim 21, wherein one of the targets differs in type from at least one other target.

27. A computer, comprising a memory containing a server program having functions, the functions comprising:
on a computer connected to a network, aggregating at least two policy deployment operations, providing a different target is associated with each policy deployment operation, providing a, policy is associated with each target, providing the targets are resources connected to the network, providing each policy deployment operation comprises the policy and an identification of the particular target to which the policy of that policy deployment operation is associated and providing the step of aggregating the policy deployment operations comprises assembling the policy deployment operations of a plurality of policies into a combined instruction; and
from the computer, transferring the combined instruction at substantially the same time to at least two policy configuration agents, providing each policy configuration agent is located remote from the computer, providing each policy configuration agent is accessible via the network, and providing each policy configuration agent has capability of implementing at least one policy on at least one target associated with that policy configuration agent.

28. The computer as recited in claim 27, wherein the target is selected from the group consisting of an electronic device, an interface of the electronic device, function implementable on the electronic device, function implementable on the interface of the electronic device, a software program, and function implementable in the software program.

29. The computer as recited in claim 27, wherein the functions further comprise:
in a status list comprising status entries, providing each status entry comprises a target identification, an associated policy identification, and a status indicator for each aggregated policy deployment operation, when one of the policies has been implemented on the associated target, updating the status entry for the target to indicate policy implementation completed.

30. The computer as recited in claim 29, wherein the functions further comprise:
when all policies in the status list have been implemented, updating a list-status indicator to indicate that all policies in the status list have been implemented.

31. The computer as recited in claim 27, wherein one of the policies comprises at least one rule which differs from each and every rule of at least one other policy.

32. The computer as recited in claim 27, wherein one of the targets differs in type from at least one other target.

33. A computer, comprising a memory containing a server program having functions, the functions comprising:

on a computer connected to a network, aggregating at least two policy undeployment operations, providing a different target is associated with each policy undeployment operation, providing a policy is associated with each target, providing the targets are resources connected to the network, providing each policy undeployment operation comprises the policy and an identification of the particular target to which the policy of that policy undeployment operation is associated, and providing the step of aggregating the policy undeployment operations comprises assembling the policy undeployment operations of a plurality of policies into a combined instruction; and from the computer, transferring the combined instruction to deimplement the policies associated with the aggregated policy undeployment operations at substantially the same time to at least two policy configuration agents, providing each policy configuration agent is located remote from the computer, providing each policy configuration agent is accessible via the network, and providing each policy configuration agent has capability of deimplementing at least one policy on at least one target associated with that policy configuration agent.

34. The computer as recited in claim 33, wherein the target is selected from the group consisting of an electronic device, an interface of the electronic device, function implementable on the electronic device, function implementable on the interface of the electronic device, a software program, and function implementable in the software program.

35. The computer as recited in claim 33, wherein the functions further comprise:

in a status list comprising status entries, providing each status entry comprises a target identification, an associated policy identification, and a status indicator for each aggregated policy undeployment operation, when one of the policies has been deimplemented on the associated target, updating the status entry for the target to indicate policy deimplementation completed.

36. The computer as recited in claim 35, wherein the functions further comprise:

when all policies in the status list have been deimplemented, updating a list-status indicator to indicate that all policies in the status list have been deimplemented.

37. The computer as recited in claim 33, wherein one of the policies comprises at least one rule which differs from each and every rule of at least one other policy.

38. The computer as recited in claim 33, wherein one of the targets differs in type from at least one other target.

* * * * *